US012593843B2

(12) United States Patent
Cor

(10) Patent No.: US 12,593,843 B2
(45) Date of Patent: Apr. 7, 2026

(54) METHOD FOR IMPROVING SEED GERMINATION AND/OR PLANT TOLERANCE TO ENVIRONMENTAL STRESS

(71) Applicant: DANSTAR FERMENT AG, Zug (CH)

(72) Inventor: Olivier Cor, Saint Jean de Boiseau (FR)

(73) Assignee: DANSTAR FERMENT AG, Zug (CH)

( * ) Notice: Subject to any disclaimer, the term of this patent is extended or adjusted under 35 U.S.C. 154(b) by 200 days.

(21) Appl. No.: 16/770,903

(22) PCT Filed: Dec. 7, 2018

(86) PCT No.: PCT/EP2018/084045
§ 371 (c)(1),
(2) Date: Jun. 8, 2020

(87) PCT Pub. No.: WO2019/110828
PCT Pub. Date: Jun. 13, 2019

(65) Prior Publication Data
US 2021/0169077 A1     Jun. 10, 2021

(30) Foreign Application Priority Data
Dec. 7, 2017     (EP) ..................................... 17290158

(51) Int. Cl.
*A01N 37/44* (2006.01)

(52) U.S. Cl.
CPC .................................... *A01N 37/44* (2013.01)

(58) Field of Classification Search
CPC .......... A01N 37/44; A01N 25/00; A01C 1/06; A01P 21/00
See application file for complete search history.

(56) References Cited

U.S. PATENT DOCUMENTS

2005/0160500 A1* 7/2005 Castigioni ............ C07K 14/415
800/288

FOREIGN PATENT DOCUMENTS

| CN | 10496547 A | 3/2015 | |
|---|---|---|---|
| FR | 2990107 A1 | 11/2013 | |
| WO | 1995035022 A1 | 12/1995 | |
| WO | WO-9535022 A1 * | 12/1995 | ............... A01C 1/06 |
| WO | 1996014749 A1 | 5/1996 | |
| WO | WO-9614749 A1 * | 5/1996 | ............. A01N 37/44 |
| WO | 1996041530 A1 | 12/1996 | |
| WO | 1996041532 A1 | 12/1996 | |
| WO | 1997008951 A1 | 3/1997 | |
| WO | 1998037763 A1 | 9/1998 | |
| WO | 1999001032 A1 | 1/1999 | |
| WO | 2018187345 A1 | 10/2018 | |

OTHER PUBLICATIONS

Jitender Giri; Glycinebetaine and abiotic stress tolerance in plants; Plant Signaling & Behavior 6:11, 1746-1751; Nov. 2011.*

Bessieres et al.; A Single-Step Purification for Glycine Betaine Determination in Plant Extracts by Isocratic HPLC; J. Agric. Food Chem.; vol. 47; 1999; pp. 3718-3722.*

Agboma, P.C., et al. "Exogenous Glycinebetaine Enhances Grain Yield of Maize, Sorghum, and Wheat Grown Under Two Supplementary Watering Regimes," Journal of Agronomy and Crop Science 178:29-37, 1997.

Anjum, S.A., et al., "Protective Role of Glycinebetaine in Maize Against Drought-Induced Lipid Peroxidation by Enhancing Capacity of Antioxidative System," Australian Journal of Crop Science 6(4):576-583, Jan. 2012.

Ashraf, M., and M.R. Foolad, "Roles of Glycine Betaine and Proline in Improving Plant Abiotic Stress Resistance," Environmental and Experimental Botany, 59(2):206-216, 2007.

Chen, T.H., and N. Murata, "Glycinebetaine: an Effective Protectant Against Abiotic Stress in Plants," Trends in Plant Science 13(9):499-505, 2008.

Iqbal, N., et al., "Influence of Water Stress and Exogenous Glycinebetaine on Sunflower Achene Weight and Oil Percentage," International Journal of Environmental Science and Technology 2:(2):155-160, 2005.

Makela, P., et al., "Effect of Foliar Applications of Glycinebetaine on and Summer Turnip Rape in Finland," Journal of Agronomy and Crop Science 176:223-234, 1996.

Mickelbart, Michael V., et al., "Endogenous Levels and Exogenous Application of Glycinebetaine to Grapevines," Scientia Horticulturae 111:7-16, Dec. 2006.

Nawaz, K., et al., "Modulation of Growth Parameters, Proline Content and Mineral Nutrients in Maize (*Zea mays* L.) by Exogenously Applied Glycinebetaine at Different Growth Stages Under Salt Stress," Journal of Applied Botany and Food Quality 83:204-211, 2010.

(Continued)

*Primary Examiner* — Kent L Bell

(74) *Attorney, Agent, or Firm* — Christensen O'Connor Johnson Kindness PLLC

(57)     ABSTRACT

The present disclosure relates to a seed of a plant, a seedling or a plant derived from the seed containing an increased internal concentration of glycine-betaine compared to untreated controls. The present disclosure further relates to a method to produce a seed of a plant, a seedling or a plant derived from said seed containing an increased internal concentration of glycine-betaine which will confer to the seed, seedling or plant derived from said seed an enhanced germination potential and/or increased tolerance against various environmental stresses compared to untreated controls. The present disclosure further relates to uses of glycine-betaine for enhancing the germination potential of a seed and/or for increasing the tolerance of a seed against environmental stress. The present disclosure also relates to seedlings and plants, or parts thereof, derived from a seed of the present invention having an increased international concentration of glycine-betaine. The present disclosure further relates to seedlings or plants, or parts thereof, obtainable by the methods of the present invention.

11 Claims, No Drawings

(56)  References Cited

OTHER PUBLICATIONS

Qi, L.-P., et al., "Effects of Chemical Regulation on Maize Photosynthesis and Yield Under Low Temperature Stress During Grain Filling Stage," Journal of Maize Sciences, 21(3):52-56, 2013.

Raza, M.A.S., et al., "Glycinebetaine Applied Under Drought Improved the Physiological Efficiency of Wheat (*Triticum aestivum* L.) Plant," Plant Soil and Environment 31(1):67-71, Jan. 2012.

Wang, Y.-M., et al., "Effects of Exogenous Betaine on Physiological Responses of Peach Tree Under Water Stress," Chinese Journal of Applied Ecology 18(3):542-548, Mar. 2007.

Zhang, L., et al., "Differential Plant Growth and Osmotic Effects of Two Maize (*Zea mays* L.) Cultivars to Exogenous Glycinebetaine Application Under Drought Stress," Plant Growth Regulation 58:297-305, 2009.

Miller Chemical & Fertilizer Corporation, Word Mark "Greenstim", Registration No. 2280299, Registration Date Sep. 28, 1999, First Use Sep. 18, 1992.

Makela, P., et al., "Uptake and Translocation of Foliar-Applied Glycinebetaine in Crop Plants," Plant Science 121(2):221-230, Dec. 1996.

Office Action issued in related CA Application No. 3,084,102, filed Dec. 7, 2018, 3 pages.

\* cited by examiner

METHOD FOR IMPROVING SEED GERMINATION AND/OR PLANT TOLERANCE TO ENVIRONMENTAL STRESS

TECHNOLOGICAL FIELD

The present disclosure relates to a seed of a plant, a seedling or a plant derived from the seed containing an increased internal concentration of glycine-betaine and method for producing the same. The present disclosure also relates to a method for providing a benefit to a seed of a plant, or the seedling or plant derived from said seed. More particularly, the present disclosure provides a method for producing a seed of a plant or seedling or a plant derived from the seed having enhanced seed germination and/or increased tolerance against various environmental stresses. The present disclosure further relates to uses of glycine-betaine for enhancing the germination potential of a seed and/or for increasing the tolerance of a seed against environmental stress. The present disclosure also relates to seedlings and plants, or parts thereof, derived from a seed of the present invention having an increased international concentration of glycine-betaine. The present disclosure further relates to seedlings or plants, or parts thereof, obtainable by the methods of the present invention.

BACKGROUND

Plant growth and development are affected by various environmental stresses such as water-deficit, drought, extreme wetness, salinity, nutrient deficiency and suboptimal temperatures. Indeed, stresses affect plant performance such as yield reduction, increased susceptibility to diseases and pests, reduced seed germination, reduced plant growth and reproductive failure. It is during the seed germination and seedling growth stages that the plants are the most vulnerable to environmental stresses. For example, extreme temperatures, in particular cold and chill, delay germination and emergence of the seedlings and reduce the plant's height and its root length. It is known that rapid and uniform seed germination help plants to establish a healthy stand.

Glycine-betaine (N,N,N-trimethylglycine) is the most abundant osmoprotectant produced in plants in response to dehydration induced by drought, salinity, and suboptimal temperatures (Ashraf and Fooled, 2007; Chen and Murata, 2008). Accumulation of glycine-betaine under stressful environmental conditions has been well documented in many plants. Non- or low-glycine-betaine accumulating plants showed enhanced stress tolerance upon the transformation of genes regulating the glycine-betaine-synthesis pathway (Ashraf and Fooled, 2007). Therefore, because glycine-betaine has been shown to provide some protection to plants from stressful environmental conditions it has been used to treat soils, plants and seeds.

For example, WO 95/35022 discloses a method for treating seeds with betaine to enhance seedling growth and protect seeds against adverse environmental conditions. The seeds may be soaked and dried or coated with betaine. The adverse conditions enumerated are water stress, excess NaCl, extreme temperature or pH and heavy metal toxicity.

Seed coating is a popular method used in agriculture for applying a variety of chemical agents to enhance their performance, and to optimize the growth and development of the plant following germination. However, it is known that several problems exist in relation with seed coating formulation system. For example, an active ingredient that might be used to coat a seed before germination might need to become efficacious only after the seed has germinated. Or, as another example, a component in the coating might be expected to release its active ingredient(s) over a prolonged period, perhaps during the entire germination period. Therefore, an active ingredient expected to be effective over such a long period during the seed lifecycle can be vulnerable to ambient conditions where the seed has been planted, such as rainfall, soil moisture conditions, temperature variability, sun exposure, and the like. Depending on the composition of the seed coating, the components or active ingredients are susceptible to run-off or can be eroded by biological activities in the fields (such as microorganisms or pests) which will induce an eventual loss of effectiveness of the coating treatment.

Thus, there remains a need to produce a seed of plant, a seedling or a plant derived from the seed containing an increased internal concentration of glycine-betaine which will confer to the seed of plant, the seedling or the plant derived from the seed an enhanced germination potential and/or tolerance against various environmental stresses. There remains a further need to produce glycine-betaine seed which internal glycine-betaine content will be protected from the environmental activities that can degrade or remove, for example, glycine-betaine in whole or in part from a glycine-betaine coated seed. The seed germination and/or yields is enhanced and the seedlings and plants derived from the glycine-betaine enriched seeds are protected against various abiotic stresses.

BRIEF SUMMARY OF THE INVENTION

The method of the present disclosure provides a seed of a plant, a seedling or a plant derived from the seed containing an increased internal concentration of glycine-betaine enabling the growth of plant with the desired properties due to the presence of such internal glycine-betaine within the seed. The present disclosure relates to a method for producing seeds containing increased internal concentration of glycine-betaine having enhanced seed germination and/or tolerance against environmental stresses in comparison to untreated control. In the method of the present disclosure, the internal content of glycine-betaine remains present over time and does not decompose, degrade or otherwise lose its activity in comparison with glycine-betaine coated seeds which glycine-betaine coated seeds are susceptible to environmental perturbations.

Thus, the present invention provides a method for producing a seed having an increased internal concentration of glycine-betaine, comprising the steps of:

(a) contacting an aerial part of a plant, a flower part of a plant or a flower of a plant with an effective amount of glycine-betaine; and (b) collecting a seed of the plant treated with glycine-betaine obtained after step (a), wherein said seed has an increased internal concentration of glycine-betaine compared to a seed from an untreated control plant. The method may further comprise a step of:

(c) growing said seed having an increased internal concentration of glycine-betaine to produce a seedling or a plant derived from said seed.

The step of contacting a plant with glycine-betaine may be executed via applying the glycine-betaine to the aerial part of the plant, the flower part of the plant or the flower around the flowering time or at the time of flowering whereby the glycine-betaine is directed to the interior of the seed produced by the plant. The glycine-betaine may be applied by spraying. The step of contacting the aerial part of a plant, the flower part of a plant or the flower of a plant with the effective amount of glycine-betaine may be performed by applying the glycine-betaine in an amount of about 1 to 10 kg/hectare, 2 to 8 kg/hectare, 3 to 7 kg/hectare or 4 to 6 kg/hectare.

In any of the methods of the present invention described herein, the internal concentration of glycine-betaine in said seed may be increased by at least about 2%, 3%, 4%, 5%, 10%, 15%, 25%, 30%, 35%, 40%, 45%, 50%, 100%, 200%, 300%, 400%, 500%, 750%, or 1000% compared to a seed from an untreated a control plant.

In any of the methods of the present invention described herein, said seed, the seedling or the plant derived from said seed may have an enhanced germination potential and/or increased tolerance against environmental stress compared to untreated controls. In any of the methods of the present invention described herein, the environmental stress may be selected from cold temperature, extreme temperature, water-deficit, drought, and combinations thereof. In any of the methods of the present invention described herein, the environmental stress may be cold temperature.

The present invention also provides a method for enhancing the germination potential of a seed and/or increasing the tolerance of a seed against environmental stress, the method comprising:

(a) contacting an aerial part of a plant, a flower part of a plant or a flower of a plant with an effective amount of glycine-betaine; and (b) collecting a seed produced by the plant treated with glycine-betaine obtained after step (a), wherein said seed has enhanced germination potential and/or increased tolerance against environmental stress compared to a seed from a control plant which has not been treated with glycine-betaine. Said seed may have an increased internal concentration of glycine-betaine compared a to seed from an untreated control plant. The method may further comprise (c) a step of growing said seed to produce a seedling or a plant derived from said seed.

The step of contacting the aerial part of the plant, the flower part of the plant or the flower plant with glycine-betaine may be executed via applying the glycine-betaine to the aerial part of the plant, the flower part of the plant or the flower around the flowering time or at the time of flowering whereby the glycine-betaine is directed to the interior of the seed produced by the plant. The glycine-betaine may be applied by spraying.

The step of contacting the aerial part of a plant, the flower part of a plant or the flower of a plant with an effective amount of glycine-betaine may be performed by applying the glycine-betaine in an amount of about 1 to 10 kg/hectare, 2 to 8 kg/hectare, 3 to 7 kg/hectare or 4 to 6 kg/hectare.

The method for enhancing the germination potential of a seed and/or increasing the tolerance of a seed against environmental stress of the present invention described herein may be for increasing the tolerance of a seed, a seedling or a plant derived from said seed against cold temperatures or extremes in temperature. The tolerance of a seed, a seedling or a plant derived from said seed against cold temperatures or extremes in temperature may be increased by at least about 0.2%, 0.4%, 0.6%, 0.8%, 1%, 1.2%, 1.4%, 1.6%, 1.8%, 2%, 3%, 4%, 5%, 10%, 20%, 25%, 30%, 35%, 40%, 45%, or 50% compared to an untreated control.

The method for enhancing the germination potential of a seed and/or increasing the tolerance of a seed against environmental stress of the present invention described herein may be for increasing the tolerance of a seed, a seedling or a plant derived from said seed against drought or water-deficit condition. The method for enhancing the germination potential of a seed and/or increasing the tolerance of a seed against environmental stress of the present invention described herein may be for enhancing seed germination potential. The seed germination potential may be enhanced by at least about 0.2%, 0.4%, 0.6%, 0.8%, 1%, 1.2%, 1.4%, 1.6%, 1.8%, 2%, 3%, 4%, 5%, 10%, 20%, 25%, 30%, 35%, 40%, 45%, or 50% compared to a seed from untreated control plant.

The present invention further provides a method for enhancing seed germination potential and/or increasing the tolerance of a seed, or a seedling or a plant derived from said seed, to environmental stress, comprising the steps of:

(a) contacting an aerial part of a plant, a flower part of a plant or a flower of a plant with an effective amount of glycine-betaine; and (b) collecting a seed produced by the plant treated with glycine-betaine obtained after step (a), wherein said seed has an enhanced germination potential and/or an increased tolerance against environmental stress compared to a seed from an untreated control plant or wherein the seedling or the plant derived from said seed has an increased tolerance against environmental stress compared to a seedling or plant derived from an untreated control seed. Said seed may have an increased internal concentration of glycine-betaine compared to seeds from an untreated control plant. The method may further comprise (c) a step of growing said seed to produce a seedling or a plant derived from said seed.

The step of contacting the aerial part of the plant, the flower part of the plant or the flower plant with glycine-betaine may be executed via applying the glycine-betaine to the aerial part of the plant, the flower part of the plant or the flower around the flowering time or at the time of flowering whereby the glycine-betaine is directed to the interior of the seed produced by the plant. The glycine-betaine may be applied by spraying.

The step of contacting the aerial part of a plant, the flower part of a plant or the flower of a plant with an effective amount of glycine-betaine may be performed by applying the glycine-betaine in an amount of about 1 to 10 kg/hectare, 2 to 8 kg/hectare, 3 to 7 kg/hectare or 4 to 6 kg/hectare.

The method for enhancing seed germination potential and/or increasing the tolerance of a seed, or a seedling or a plant derived from said seed, to environmental stress of the present invention described herein may be for increasing the tolerance of a seed, a seedling or a plant derived from said seed against cold temperatures or extremes in temperature. The tolerance of a seed, a seedling or a plant derived from said seed against cold temperatures or extremes in temperature is increased by at least about 0.2%, 0.4%, 0.6%, 0.8%, 1%, 1.2%, 1.4%, 1.6%, 1.8%, 2%, 3%, 4%, 5%, 10%, 20%, 25%, 30%, 35%, 40%, 45%, or 50% compared to an untreated control.

The method for enhancing seed germination potential and/or increasing the tolerance of a seed, or a seedling or a plant derived from said seed, to environmental stress of the present invention described herein may be for increasing the tolerance of a seed, a seedling or a plant derived from said seed against drought or water-deficit condition. The method for enhancing seed germination potential and/or increasing the tolerance of a seed, or a seedling or a plant derived from said seed, to environmental stress of the present invention described herein may be for enhancing seed germination potential. The seed germination potential may be enhanced by at least about 0.2%, 0.4%, 0.6%, 0.8%, 1%, 1.2%, 1.4%, 1.6%, 1.8%, 2%, 3%, 4%, 5%, 10%, 20%, 25%, 30%, 35%, 40%, 45%, or 50% compared to a seed from an untreated control plant.

In any of the methods of the present invention described herein, said seed may be a corn seed, a wheat seed, a rice seed, a soya seed or a colza seed.

The present invention also provides a seed having an increased internal concentration of glycine-betaine obtainable by a method of the present invention described herein.

The present invention also provides seed having an increased internal concentration of glycine-betaine compared to an untreated control, wherein said seed is obtainable by contacting an aerial part of a plant, a flower part of a plant or a flower of a plant with an effective amount of glycine-betaine. Said seed may be obtainable by:

contacting an aerial part of a plant, a flower part of a plant or a flower of a plant with an effective amount of glycine-betaine; and collecting a seed from the plant treated with glycine-betaine.

The internal concentration of glycine-betaine of a seed of the present invention described herein or a seed obtainable by a method of the present invention described herein may be increased by at least about 2%, 3%, 4%, 5%, 10%, 15%, 25%, 30% or 35% 40%, 45%, 50%, 100%, 200%, 300%, 400%, 500%, 750%, or 1000% compared to an untreated control. The internal concentration of glycine-betaine of a seed of the present invention described herein or a seed obtainable by a method of the present invention described herein may have enhanced germination potential and/or an increased tolerance against environmental stress compared to an untreated control. The tolerance of said seed against environmental stress may be increased by at least about 0.2%, 0.4%, 0.6%, 0.8%, 1%, 1.2%, 1.4%, 1.6%, 1.8%, 2%, 3%, 4%, 5%, 10%, 20%, 25%, 30%, 35%, 40%, 45%, or 50% compared to an untreated control. The environmental stress may be selected from cold temperature, extreme temperature, water-deficit, drought, and combinations thereof. The environmental stress may be cold temperature. The germination potential of said seed may be enhanced by at least about 0.2%, 0.4%, 0.6%, 0.8%, 1%, 1.2%, 1.4%, 1.6%, 1.8%, 2%, 3%, 4%, 5%, 10%, 20%, 25%, 30%, 35%, 40%, 45%, or 50% compared to an untreated control. Said seed may be a corn seed, a wheat seed, a rice seed, a soya seed or a colza seed.

The present invention further provides use of glycine-betaine for producing a seed having an enhanced germination potential and/or an increased tolerance against environmental stress compared to an untreated control, wherein the glycine-betaine is applied to an aerial part of a plant, a flower part of a plant or a flower of a plant. Use of glycine-betaine according to the present invention described herein may increase the internal concentration of glycine-betaine in said seed by at least about 2%, 3%, 4%, 5%, 10%, 15%, 25%, 30%, 35%, 40%, 45%, 50%, 100%, 200%, 300%, 400%, 500%, 750%, or 1000% compared to a seed from an untreated control plants. Use of glycine-betaine according to the present invention described herein may increase the tolerance of said seed against environmental stress by at least about 0.2%, 0.4%, 0.6%, 0.8%, 1%, 1.2%, 1.4%, 1.6%, 1.8%, 2%, 3%, 4%, 5%, 10%, 20%, 25%, 30%, 35%, 40%, 45%, or 50% compared to a seed from an untreated control plant. The environmental stress may be selected from cold temperature, extreme temperature, water-deficit, drought, and combinations thereof. The environmental stress may be cold temperature.

Use of glycine-betaine according to the present invention described herein may enhance the germination potential of said seed by at least about 0.2%, 0.4%, 0.6%, 0.8%, 1%, 1.2%, 1.4%, 1.6%, 1.8%, 2%, 3%, 4%, 5%, 10%, 20%, 25%, 30%, 35%, 40%, 45%, or 50 compared to an untreated control.

In any of the uses of glycine-betaine provided by the present invention described herein, the glycine-betaine may be applied to the aerial part of the plant, the flower part of the plant or the flower around the flowering time or at the time of flowering whereby the glycine-betaine is directed to the interior of the seed produced by the plant, optionally wherein the glycine-betaine is applied by spraying. In any of the uses of glycine-betaine provided by the present invention described herein, the glycine-betaine may be applied in an amount of about 1 to 10 kg/hectare, 2 to 8 kg/hectare, 3 to 7 kg/hectare or 4 to 6 kg/hectare.

In any of the uses of glycine-betaine provided by the present invention described herein, the seed may be a corn seed, a wheat seed, a rice seed, a soya seed or a colza seed.

The present invention provides a plant or seedling derived from, or comprising, a seed provided by the present invention described herein, or a part of said plant or seedling. The present invention further provides a plant or seedling derived from, or comprising, a seed obtainable by a method of the present invention described herein, or a part of said plant or seedling.

The present invention also provides a plant or seedling, or a part of said plant or seedling, obtainable by any method of the present invention described herein which comprises the step of (c) growing said seed having an increased internal concentration of glycine-betaine to produce a seedling or a plant derived from said seed.

DETAILED DESCRIPTION

Unless defined otherwise, all technical and scientific terms used herein have the same meaning as commonly understood by one of ordinary skill in the art to which this invention belongs. Also, unless otherwise required by context, singular terms shall include pluralities and plural terms shall include the singular. All publications, patents and other references mentioned herein are incorporated by reference in their entireties for all purposes.

The method according to the present disclosure uses a new way for introducing glycine-betaine into plants without harming plant seeds during or after the application. The seeds produced with this method contain a higher or an increased internal concentration of glycine-betaine compared to untreated control seeds. Glycine-betaine is applied to the aerial parts of a plant, flower parts of a plant or flowers of a plant which are used as a natural entry into the plant and which allow an efficient introduction of the glycine-betaine into the next generation of plant seeds. More particularly, when glycine-betaine is applied, for example, by spraying, to the aerial parts of a plant at time of flowering or around the time of flowering, the glycine-betaine is translocated, transported or conveyed when the grain formation starts and is directed inside the seed (or to the emerging seed) produced by the plant. The method of the present disclosure can aid the crop productivity by enhancing seed germination and/or increasing tolerance or resistance against various environmental stresses in comparison to untreated control. Furthermore, the transportation or translocation of glycinebetaine inside the seeds instead of an external application as, for example, seed coating, makes the glycine-betaine less susceptible to environmental conditions and provide a superior compatibility to chemical seed coatings. Furthermore, by planting the seeds produced by the method of the present disclosure, the glycine-betaine is carried or conveyed to the subsequent generation plants.

Flowering plants (angiosperm) allow the transfer of the glycine-betaine to the seed in the course of grain development after the flowering phase. Suitable plants include both monocots and dicots. Examples of the monocotyledon include a gramineous (Poaceae) plant. Examples of the dicotyledon include a leguminous (Fabaceae) plant and a cruciferous (Brassicaceae) plant. In an embodiment, the plant is a gramineous plant. Examples of the gramineous plant herein include agriculturally important species such as rice, wheat, barley, rye, millet, sorghum, corn, and oat. In a further embodiment, the plant is a leguminous plant such as, for example, pea, bean, lupin, lucerne, soya or lentil. In yet another embodiment, the plant is a cruceferous plant such as colza.

In the context of the present disclosure, a glycine-betaine solution is contacted or applied to the aerial parts of a plant, flower parts of a plant or flowers of a plant via e.g. spraying an effective amount of the glycine-betaine solution at the time of flowering or around the time of flowering. The term "contacted or contacting" as used herein refers to any mode of bringing together the surface to be treated, e.g. the aerial parts of a plant, flower parts of a plant or flowers of a plant, with a glycine-betaine solution. The term "effective amount", as used herein, is an amount sufficient to effect beneficial or desired results. The term "at the time of flowering" as used in the context of the present disclosure is a period during which a host plant blooms. The term "around the flowering time" refers to the time period before the appearance of the inflorescence or to anthesis and after the end of flowering and includes the different stages of grain development. The method of contacting glycine-betaine with a plant is not limited to a specific method as long as it enables an efficient contact of the glycine-betaine solution with the plant or plant parts. Spraying is specifically useful in an industrial production method. It is recommendable to safeguard conditions which are favorable to the glycine-betaine used.

Glycine-betaine extracted from sugar beet is commercially available for example under the trademark of Greenstim®/Bluestim® (Lallemand). Other betaine products, such as betaine monohydrate, betaine hydrochloride and raw betaine liquids, are also commercially available and they can be used for the purposes of the present disclosure.

The glycine-betaine is usually applied in suspension at a suitable concentration. Accordingly, in an embodiment, the suspension of glycine-betaine is applied to the aerial parts of a plant, flower parts of a plant or flowers of a plant in either one or several successive treatments. The amount used varies depending on the plant variety and the phase of growth. For example, at least, about 0.1 to 20 kg; about 0.5 to 15 kg; about 1 to 10 kg or about 1 to 6 kg of glycine-betaine can be used per hectare. In another embodiment, glycine-betaine is applied or delivered directly to the aerial parts of a plant, flower parts of a plant or flowers of a plant in an amount of at least about 1 kg, 2 kg, 3 kg, 4 kg, 5 kg, 6 kg, 7 kg, 8 kg, 9 kg, 10 kg, 11 kg, 12 kg, 13 kg, 14 kg, 15 kg, 16 kg, 17 kg, 18 kg, 19 kg, 19 kg or 20 kg of dry matter per hectare. The amounts given here are only suggestive and the person skilled in the art can easily determine effective concentrations that work in the manner described herein.

The application may be performed for example by spraying together with some other spraying of fertilizers or pesticides, if desired. The solution of glycine-betaine may also contain wetting agents and/or surfactants which assist in permeating the aerial parts of a plant, flower parts of a plant or flowers of a plant. Glycine-betaine utilized according to the present disclosure is transported to the plant cells, actively regulates the osmotic balance of the cells and also participates in other processes of cell metabolism. A cell treated with glycine-betaine is more viable even when subjected to exogenous stress factors.

The method of the present disclosure further comprises a collecting step. The "collecting step" is a step of collecting the seeds of the plant which seeds comprise the internal increased concentration of glycine-betaine compared to untreated control seeds.

The seeds obtained by the present method can be treated like normal seeds and can be further processed in usual ways. For example, it is possible to provide a coating with growth promoting agents or other chemicals beneficial for plant growth and plant health, such as, insecticides, fungicides, repellants, fertilizers, antibiotics, etc. It is, of course, possible to provide a coating to the seed with glycine-betaine. The term "seed" as used in the context of the present disclosure refers to seeds, plant propagation material and plant propagules of all kinds including but not limited to true seeds, seed pieces, corms, bulbs, fruit, tubers, grains, cut shoots and the like. As used herein, the seed is prepared for planting and for growing.

The glycine-betaine (along with its beneficial properties) remains secured inside the seed preventing the exposure from environmental hazards. Accordingly, the seeds may be stored for considerable time without significant loss of the beneficial properties. For example, the plant seed obtained by the method of the present disclosure can be stored for at least 1 month, for at least 3 month, for at least 6 months, for at least 12 months, for at least 2 years or for at least 3 years.

The method of the present disclosure provides seeds containing a high internal concentration of glycine-betaine which can be further transported or translocated in the plant body of the next generation. As a result of experiment, it has been found that the plant body such as a seedling in the next generation can be occupied by the glycine-betaine and/or acquires the benefits provided by glycine-betaine with respect to increased tolerance against various environmental stresses. In the context of the present disclosure, the term "stress" includes, but is not limited to, all biotic and abiotic stresses that could influence a plant or seed, from infection to environment. For example, cold, heat, water-deficit, drought, salinity, chemicals, weather conditions, fungal or bacterial infection, insect infestation, soil nutrient deficiencies or excesses, soil compaction or density, light, shade, or soil pH, or any combination of these conditions, are types of stresses a plant or seed may experience and respond to. Those physical or biochemical characteristics of a plant or seed that may be influenced by stress include, for example, yield, height, color, vigor, root growth, shoot growth, flowering times and qualities, seed quality, pollen quality, reproductive potential, germination or development, resistance to fungal disease or any combination of these or other plant characteristics.

The glycine-betaine content of the seeds produced by the method of the present disclosure is increased by, at least about 2%, 3%, 4%, 5%, 6%, 7%, 8%, 9%, 10%, 11%, 12%, 13%, 14%, 15%, 16%, 17%, 18%, 19%, more than 20%, more than 25%, more than 30% in comparison with the case of untreated seeds.

The internal glycine-betaine concentration of a seed produced by the methods of the present invention descried herein may be increased by at least about 2%, 3%, 4%, 5%, 10%, 15%, 25%, 30%, 35%, 40%, 45%, 50%, 100%, 200%, 300%, 400%, 500%, 750%, 1000%, or 1100% compared to a seed from an untreated control plant. The internal glycine-betaine concentration of a seed produced by the methods of the present invention described herein may be increased by from about 2% to about 1100%, from about 3% to about 1000%, from about 5% to about 750%, from about 4% to about 500%, from about 5% to about 400%, from about 10% to about 300%, from about 15% to about 200%, from about 25% to about 100%, or from about 15% to about 50% compared to a seed from an untreated control plants.

A seed provided by the present invention described herein may have an internal concentration of glycine-betaine that is increased by at least about 2%, 3%, 4%, 5%, 10%, 15%, 25%, 30%, 35%, 40%, 45%, 50%, 100%, 200%, 300%, 400%, 500%, 750%, 1000%, or 1100% compared to a seed from an untreated control plants. A seed provided by the present invention described herein may have an internal concentration of glycine-betaine that is increased by at least about 2% to about 1100%, from about 3% to about 1000%, from about 5% to about 750%, from about 4% to about 500%, from about 5 to about 400%, from about 10% to about 300%, from about 15% to about 200%, from about 25% to about 100%, or from about 15% to about 50% compared to a seed from an untreated control plant.

Seeds, seedlings or plants derived from the seeds produced by the method of the present disclosure have an increased stress tolerance or resistance from at least about 5, 10, 20, 25, 30, 35, 40, 45 or 50% change in temperature tolerance (cold resistance or freeze resistance) or at least about 5, 10, 20, 25, 30, 35, 40, 45 or 50% change in drought tolerance (or water-deficit condition) compared to untreated controls (i.e. controls without the method of the present disclosure).

When referring to "increased tolerance to environmental stress" of a seed, a seedling or a plant obtainable by the methods of the present invention described herein, or a seed, a seedling or a plant provided by the present invention described herein, the term relates to an increase in any useful property or characteristic of said seed, seedling or plant that may be adversely affected by exposure to the environmental stress. As discussed above, useful properties or characteristics of a seed, seedling, that may be adversely affected by exposure to environmental stress may be selected from yield, height, color, vigor, root growth, shoot growth, flowering times and qualities, seed quality, pollen quality, reproductive potential, germination or development, germination potential, resistance to fungal disease or any combination of these or other plant characteristics. When referring to an "increased tolerance to environmental stress", the increase in the useful property or characteristic of the seed, seedling or plant may be a significant increase in the useful property or characteristic. A significant increase may be one that is statistically significant as determined by an appropriate statistical test. For example, a statistical test for determining whether two datasets are significantly different e.g. a t-test or any other suitable statistical test. The person skilled in the art will readily be able to use any techniques known in the art to evaluate a useful property or characteristic of a seed, seedling or plant and select and perform an appropriate statistical test.

The germination potential of a seed (an example of a useful property) may be adversely affected (i.e. reduced) by exposure to environmental stress, such as cold temperature.

Thus, for example, in order to assess the tolerance to environmental stress of a glycine-betaine-treated seed, the germination of a plurality of seeds treated with glycine-betaine may be compared to the germination of a plurality of untreated control seeds following exposure of both groups of seeds to environmental stress for an appropriate amount of time. For example, the seeds may be exposed to cold temperature (e.g. about 10° C. for 7 days). Following exposure to the environmental stress, the proportion of seeds which successful germinate can be determined for both the glycine-betaine-treated seeds and the control seeds and the two values compared. Where the proportion of glycine-betaine-treated seeds which germinate is higher (e.g. significantly higher) than the untreated control seeds, the glycine-betaine-treated seeds can be said to have increased tolerance against environmental stress (in this case increased tolerance to cold temperatures and/or increased cold resistance).

The growth, survival and/or yield of seed/fruit of a seedling or a plant may be adversely affected by exposure to environmental stress, such as cold temperature. To assess the tolerance against environmental stress of a seedling or plant of the present invention described herein, the growth, survival and/or yield of seed/fruit (or any other useful characteristic or property mentioned above) of a plurality of seedlings or plants treated with glycine-betaine may be compared to the growth, survival and/or yield of seed/fruit (or any other useful characteristic or property mentioned above) of a plurality of untreated seedlings or plants. Where the growth, survival and/or yield of seed/fruit (or any other useful characteristic or property mentioned above) is higher (e.g. significantly higher) for the glycine-betaine-treated seedlings or plants compared to the untreated control seedlings or plants, the glycine-betaine-treated seedlings or plants can be said to have increased tolerance against environmental stress e.g. increased tolerance to cold temperatures and/or increased cold resistance The tolerance to environmental stress of a seed, a seedling or a plant obtainable by the methods of the present invention described herein or a seed, a seedlings or a plant provided by the present invention described herein may be increased by at least about 0.2%, 0.4%, 0.6%, 0.8%, 1%, 1.2%, 1.4%, 1.6%, 1.8%, 2%, 3%, 4%, 5%, 10%, 20%, 25%, 30%, 35%, 40%, 45%, or 50% compared to an untreated control. The tolerance to environmental stress of a seeds, a seedlings or a plants obtainable by the methods of the present invention described herein or a seed, a seedling or a plant provided by the present invention described herein may be increased by from about 0.2% to 50%, from about 0.4% to about 45%, from about 0.6% to about 40%, from about 0.8% to about 35%, from about 1% to about 30%, from about 1.2% to about 25%, from about 1.4% to about 20%, from about 1.6% to about 10%, from about 1.8%, to about 5%, or from about 2%, to about 4% compared to an untreated control.

The tolerance to cold temperatures (e.g. cold resistance or freeze resistance) of a seed, a seedling or a plant obtainable by the methods of the present invention described herein or a seed, a seedlings or a plant provided by the present invention described herein may be increased by at least about 0.2%, 0.4%, 0.6%, 0.8%, 1%, 1.2%, 1.4%, 1.6%, 1.8%, 2%, 3%, 4%, 5%, 10%, 20%, 25%, 30%, 35%, 40%, 45%, or 50% compared to an untreated control. The tolerance to cold temperatures (e.g. cold resistance or freeze resistance) of a seed, a seedling or a plant obtainable by the methods of the present invention described herein or a seed, a seedling or a plant provided by the present invention described herein may be increased by at least about 0.2% to 50%, from about 0.4% to about 45%, from about 0.6% to about 40%, from about 0.8% to about 35%, from about 1 to about 30%, from about 1.2% to about 25%, from about 1.4% to about 20%, from about 1.6% to about 10%, from about 1.8%, to about 5%, or from about 2% to about 4% compared to an untreated control.

Furthermore, the method of the present disclosure provides seeds having enhanced seed germination potential, seedling emergence or growth of plant or a more uniform germination as compared to an untreated control. In the context of the present disclosure, the term "seed germination" relates to a clear evidence of root growth developing from the embryo on the seed especially after a period of dormancy. The term "seed germination potential" relates to the capacity of a seed to develop root growth from the embryo on the seed, for example after a period of dormancy and/or exposure to environmental stress. When referring to an "enhanced seed germination" and/or "enhanced germination potential" of a seed, these terms relate to an increase in seed germination or seed germination potential between a glycine-betaine-treated seed compared to an untreated control seed. For example, to asses an increase in seed germination or seed germination potential, the germination of a plurality of seeds treated with glycine-betaine may be compared with the germination of a plurality of untreated control seeds. The proportion of seeds which successful germinate can be determined for both the glycine-betaine-treated seeds and the control seeds and the two values compared. Where the proportion of glycine-betaine-treated seeds which germinate is higher (e.g. significantly higher) than the untreated control seeds, the glycine-betaine-treated seeds can be said to have enhanced germination. Such seeds may also be said to have "enhanced germination potential". The skilled person may use an appropriate statistical test, such as a t-test, to determine whether the proportion of glycine-betaine-treated seeds that successfully germinate is significantly higher than the proportion of untreated control seeds that successfully germinate. In the context of the present disclosure, the term "seedling emergence" is meant to refer to growth of the plant which is observable above the rooting medium surface. The method of the present disclosure provides greater seed germination, seedling emergence or growth of plant from at least about 5, 10, 20, 25, 30, 35, 40, 45 or 50% compared to untreated controls.

The germination or germination potential of a seed obtainable by the methods of the present invention described herein or a seed provided by the present invention described herein may be increased by at least about 0.2%, 0.4%, 0.6%, 0.8%, 1%, 1.2%, 1.4%, 1.6%, 1.8%, 2%, 3%, 4%, 5%, 10%, 20%, 25%, 30%, 35%, 40%, 45%, or 50% compared to a seed from an untreated control plant. The germination or germination potential of a seed obtainable by the methods of the present invention described herein or a seed provided by the present invention described herein may be increased by at least about 0.2% to 50%, from about 0.4% to about 45%, from about 0.6% to about 40%, from about 0.8% to about 35%, from about 1% to about 30%, from about 1.2% to about 25%, from about 1.4% to about 20%, from about 1.6% to about 10%, from about 1.8%, to about 5%, or from about 2% to about 4% compared to a seed from an untreated control plant.

The present disclosure will be more readily understood by referring to the following examples which are given to illustrate the disclosure rather than to limit its scope.

12

EXAMPLES

Example 1: Effect of Exogenous/Foliar Application of Glycine-Betaine on Corn Seed Internal Glycine-Betaine Concentration

Methodology

The field trial was performed with two different varieties of corn: the LG 32.58 variety and the Casey variety.

To prevent auto-fertilization during the corn seed production, the male reproductive parts of the female line were removed prior to the time of pollen shed.

The commercial Greenstim® (Lallemand) formulation was sprayed to the female line leaves during grain development stage at the equivalent of 4 kg/hectare. Each repetition consists of 18 plants. Control plants were treated with water.

Seeds (200) were collected at maturity. Seeds were ground using a ball mill and extracted with ethanol. Samples were evaporated to dryness and dissolved in deuterium oxide (D2O) (50 mg/ml). 1H-NMR analysis (Bruker, at 500 MHz) was performed using 3-(trimethylsilyl)-1-propane sulfonate sodium salt (DSS) as the internal standard. Values in ppm assigned to NMR signals are chemical shifts of the 9 protons which give the signal, for the glycine-betaine, at 3.251 ppm. A total of three extractions were performed on each sample.

Results

TABLE 1

Internal concentration of glycine-betaine in corn seeds of the variety LG 32.58

| Corn plant | Rep | GB concentration ($\mu g \cdot g^{-1}$ MS) | | |
| | | Control (plants treated with water) | GB (plants treated with GB) | % GB increase compared to control |
| --- | --- | --- | --- | --- |
| LG 32.58 | 1 | 33.32a* | 38.53b | 15.6% |
| LG 32.58 | 2 | 33.79a | 41.18b | 21.9% |
| LG 32.58 | 3 | 34.55a | 37.71b | 9.1% |

*Values sharing different letter are statistically significantly different from each other ($p < 0.05$)

TABLE 2

Internal concentration of glycine-betaine in corn seeds of the variety Casey

| Corn plant | Rep | GB concentration ($\mu g \cdot g^{-1}$ MS) | | |
| | | Control (plants treated with water) | GB (plants treated with GB) | % GB increase compared to control |
| --- | --- | --- | --- | --- |
| Casey | 1 | 70.37a* | 83.91b | 19.2% |
| Casey | 2 | 58.82a | 79.19b | 34.6% |
| Casey | 3 | 75.83a | 79.33b | 4.6% |

*Values sharing different letter are statistically significantly different from each other ($p < 0.05$)

TABLE 3

Seed weight (g) after treatment with glycine-betaine compared to non-treated seed weight

| Corn plant variety | Rep | Mean Control (plants treated with water) | Mean GB (plants treated with GB) | P(t <= t(cal)) | |
|---|---|---|---|---|---|
| Variety 1 | 1 | 297.35 | 317.39 | 10.62% | N.S. |
| Variety 1 | 2 | 350.42 | 363.11 | 24.52% | N.S. |
| Variety 1 | 3 | 544.7 | 532.96 | 32.75% | N.S. |

N.S. - denotes not statistically significant difference

TABLE 4

Internal concentration of glycine-betaine (mg/kg) in corn seed

| Corn plant variety | Rep | Mean GB Control (plants treated with water) | Mean GB (plants treated with GB) | Variance of difference | Percentage increase in internal GB concentration | |
|---|---|---|---|---|---|---|
| Variety 1-female 1 | 1 | 4.37 | 6.67 | 13.97 | 53% | S |
| Variety 1-female 2 | 2 | 0.42 | 5.19 | 1.409 | 1135% | S |
| Variety 1-female 3- | 3 | 5.99 | 6.89 | 3.579 | 15% | S |

S-denotes statistically significant difference

The results disclosed in Tables 1 to 4 revealed that glycine-betaine can be introduced within the corn seeds by spraying the plants at the flowering stage. The internal glycine-betaine content of the seeds produced by the method of the present disclosure is significantly higher compared to untreated seeds.

Example 2: Effect of Low Temperature on Corn Seed Germination

Methodology

Two hundred seeds of each treatment (plants treated with water and plants treated with glycine-betaine) were planted onto moistened sand. Samples were placed into a germination chamber at 10° C. for a period of 7 days. Samples were then transferred to a germination chamber set to 25° C. for 5 days. The experiment was conducted with a variety of seeds with increased cold tolerance compared to more traditional seed varieties. The germination rate of standard seeds after a cold germination test is between 50 to 70%.

Results

TABLE 5

Effect of cold temperature on corn seed germination

| Variety | Seed germination percentage (plants treated with water) | Seed germination percentage (plants treated with GB) | Variance of difference | Percentage increase in germination | P(t <= t(cal)) | |
|---|---|---|---|---|---|---|
| Variety-female 3 | 84.83 | 86.61 | 29.83 | 2.1% | 9.25% | S |

S-denotes statistically significant difference

The results disclosed in Table 5 show that seeds with an increased internal content of glycine-betaine had a significantly better seed germination percentage after cold treatment compared with untreated seeds (i.e. seeds from control plants, i.e. treated with water).

While the invention has been described in connection with specific embodiments thereof, it will be understood that the scope of the claims should not be limited by the preferred embodiments set forth in the examples, but should be given the broadest interpretation consistent with the description as a whole.

Further aspects and embodiments of the present invention are set out in the following numbered paragraphs:

1. A method for producing a seed containing an increased internal concentration of glycine-betaine, comprising:
   (a) a step of contacting an aerial part of a plant, a flower part of a plant or a flower of a plant with an effective amount of glycine-betaine; and
   (b) a step of collecting the seeds of the plant treated with glycine-betaine obtained after step (a), wherein said seeds contained an increased internal concentration of glycine-betaine compared to untreated controls.

2. The method of paragraph 1, further comprising
   (c) a step of growing said seed to produce a seedling or a plant derived from the seed containing an increased internal concentration of glycine-betaine compared to seedlings or plants germinated from untreated controls.

3. The method of paragraph 1 or 2, wherein the step of contacting a plant with glycine-betaine is executed via spraying the glycine-betaine around the flowering time or at the time of flowering whereby the glycine-betaine is directed to the interior of the seed produced by the plant.

4. The method of any one of paragraphs 1 to 3, wherein the step of contacting the aerial part of a plant, the flower part of a plant or the flower of a plant with an effective amount of glycine-betaine is performed by applying the glycine-betaine in an amount of about 1 to 10 kg/hectare, 2 to 8 kg/hectare, 3 to 7 kg/hectare or 4 to 6 kg/hectare.

5. The method of any one of paragraphs 1 to 5, wherein the internal concentration of glycine-betaine is increased by at least about 2%, 3%, 4%, 5%, 10%, 15%, 25%, 30% or 35% compared to untreated controls.

6. The method of any one of paragraphs 1 to 5, wherein the seed is a corn seed, a wheat seed, a rice seed, a soya seed or a colza seed.

7. The method of any one of paragraphs 2 to 6, wherein the seed, the seedling or the plant derived from the seed has an enhanced germination potential and/or increased tolerance against environmental stress compared to untreated controls.

8. A method for enhancing seed germination and/or increasing the tolerance of a seed, a seedling or a plant derived from the seed to environmental stress, comprising:

(a) a step of contacting an aerial part of a plant, a flower part of a plant or a flower of a plant with an effective amount of glycine-betaine; and (b) a step of collecting the seeds of the plant treated with glycine-betaine obtained after step (a) wherein said seeds exhibit an enhanced seed germination compared to untreated controls and/or have an increased tolerance against environmental stress compared to untreated control seeds, seedlings or plants.

9. The method of paragraph 8, further comprising (c) a step of growing said seed to produce a seedling or a plant derived from the seed containing an increased internal concentration of glycine-betaine compared to seedlings or plants germinated from untreated controls, wherein the seeds exhibit enhanced seed germination compared to untreated controls or the seedlings or plants germinated from the seeds have an increased tolerance against environmental stress compared to seedlings or plants germinated from untreated controls.

10. The method of paragraph 8 or 9, wherein the step of contacting a plant with glycine-betaine is executed via spraying the glycine-betaine around the flowering time or at the time of flowering whereby the glycine-betaine is directed to the interior of the seed produced by the plant.

11. The method of any one of paragraphs 8 to 10, wherein the step of contacting the aerial part of a plant, the flower part of a plant or the flower of a plant with an effective amount of glycine-betaine is performed by applying the glycine-betaine in an amount of about 1 to 10 kg/hectare, 2 to 8 kg/hectare, 3 to 7 kg/hectare or 4 to 6 kg/hectare.

12. The method of any one of paragraphs 8 to 11 for increasing the tolerance of a seed, a seedling or a plant derived from said seed towards cold temperatures or extremes in temperature.

13. The method of any one of paragraph 8 to 11 for increasing the tolerance of a seed, a seedling or a plant derived from said seed towards drought or water-deficit condition.

14. The method of paragraph 12, wherein the tolerance of a seed, a seedling or a plant derived from said seed towards cold temperatures or extremes in temperature is increased from at least about 5, 10, 20, 25, 30, 35, 40, 45 or 50% compared to untreated controls.

15. The method of paragraph 13, wherein the tolerance of a seed, a seedling or a plant derived from said seed towards drought or water-deficit condition is increased from at least about 5, 10, 20, 25, 30, 35, 40, 45 or 50% compared to untreated controls.

16. The method of any one of paragraphs 8 to 11 for enhancing seed germination.

17. The method of paragraph 16, wherein the seed germination is enhanced from at least about 5, 10, 20, 25, 30, 35, 40, 45 or 50% compared to untreated controls.

18. The method of any one of paragraphs 8 to 17, wherein the seed is a corn seed, a wheat seed, a rice seed, a soya seed or a colza seed.

19. A seed comprising an increased internal concentration of glycine-betaine compared to untreated controls obtainable by contacting an aerial part of a plant, a flower part of a plant or a flower of a plant with an effective amount of glycine-betaine wherein the glycine-betaine is present in the interior of the seed.

20. The seed of paragraph 19, wherein the internal concentration of glycine-betaine is increased by at least about 2%, 3%, 4%, 5%, 10%, 15%, 25%, 30% or 35% compared to untreated controls.

21. The seed of paragraph 19 or 20, wherein the seed has an enhanced germination potential and/or an increased tolerance against environmental stress compared to untreated controls.

22. The seed of paragraph 21, wherein the tolerance against environmental stress is increased from at least about 5, 10, 20, 25, 30, 35, 40, 45 or 50% compared to untreated controls.

23. The seed of paragraph 21, wherein the germination is enhanced from at least about 5, 10, 20, 25, 30, 35, 40, 45 or 50% compared to untreated controls.

24. The seed of any one of paragraphs 19 to 23, wherein the seed is a corn seed, a wheat seed, a rice seed, a soya seed or a colza seed.

The invention claimed is:

1. A method for:

(i) producing a seed having an increased internal concentration of glycine-betaine, comprising the steps of:

(a) contacting an aerial part of a plant, a flower part of a plant or a flower of a plant with glycine-betaine;

(b) collecting a plurality of seeds of the plant treated with glycine-betaine obtained after step (i) (a); and (c) assessing/measuring the concentration of the glycine betaine in one of the plurality of seeds collected in step (b); and (d) growing said plurality of seeds to produce seedlings or plants derived from said seeds, wherein the internal concentration of glycine-betaine assessed/measured in step (c) as compared to a seed from an untreated control plant is increased by at least 2%; or (ii) enhancing seed germination potential and/or increasing the tolerance of a seed, or a seedling or a plant derived from said seed, to environmental stress, comprising the steps of:

(a) contacting an aerial part of a plant, a flower part of a plant or a flower of a plant with glycine-betaine;

(b) collecting a plurality of seeds produced by the plant treated with glycine-betaine obtained after step (ii) (a);

(c) assessing/measuring the concentration of the glycine betaine in one of the plurality of seeds collected in step (b); and (d) growing said plurality of seeds to produce seedlings or plants derived from said seeds, wherein the internal concentration of glycine-betaine assessed/measured in step (c) as compared to a seed from an untreated control plant is increased by at least 2%, and wherein said seed has an enhanced germination potential and/or an increased tolerance against environmental stress compared to a seed from an untreated control plant or wherein the seedling or the plant derived from said seed has an increased tolerance against environmental stress compared to a seedling or plant derived from an untreated control seed.

2. The method of claim 1 (i) or (ii), wherein the step of contacting an aerial part of a plant, a flower part of a plant or a flower of a plant with glycine-betaine is executed via applying the glycine-betaine to the aerial part of the plant, the flower part of the plant or the flower at the time of flowering whereby the glycine-betaine is directed to the interior of the seed produced by the plant.

3. The method of claim 1 (i) or (ii), wherein the step of contacting the aerial part of a plant, the flower part of a plant or the flower of a plant with the glycine-betaine is performed by applying the glycine-betaine in an amount of 1 to 10 kg/hectare.

4. The method of claim 1 (i), wherein the internal concentration of glycine-betaine in said seed is increased by at least 3%, 4%, 5%, 10%, 15%, 25%, 30%, 35%, 40%, 45%, 50%, 100%, 200%, 300%, 400%, 500%, 750%, or 1000% compared to a seed from an untreated control plant.

5. The method of claim 1 (i) or (ii), wherein said seed is a corn seed, a wheat seed, a rice seed, a soya seed or a colza seed.

6. The method of claim 1 (i), further comprising a step of (e) growing said seed having an increased internal concentration of glycine-betaine to produce a seedling or a plant derived from said seed, wherein said seed, the seedling or the plant derived from said seed has an enhanced germination potential and/or increased tolerance against environmental stress compared to an untreated control.

7. The method of claim 1 (ii) which is for increasing the tolerance of a seed, a seedling or a plant derived from said seed against cold temperature, extreme temperature, water-deficit, drought, and combinations thereof.

8. The method of claim 1 (ii) which is for enhancing seed germination potential, wherein the seed germination potential is enhanced by at least 0.2%, 0.4%, 0.6%, 0.8%, 1%, 1.2%, 1.4%, 1.6%, 1.8%, 2%, 3%, 4%, 5%, 10%, 20%, 25%, 30%, 35%, 40%, 45%, or 50% compared to a seed from an untreated control plant.

9. The method of claim 2, wherein the glycine-betaine is applied by spraying.

10. The method of claim 6, wherein the environmental stress is selected from cold temperature, extreme temperature, water-deficit, drought, and combinations thereof.

11. The method of claim 7, wherein the tolerance of a seed, a seedling or a plant derived from said seed against cold temperatures or extremes in temperature is increased by at least 0.2%, 0.4%, 0.6%, 0.8%, 1%, 1.2%, 1.4%, 1.6%, 1.8%, 2%, 3%, 4%, 5%, 10%, 20%, 25%, 30%, 35%, 40%, 45%, or 50% compared to an untreated control.

\* \* \* \* \*